United States Patent Office 3,759,732
Patented Sept. 18, 1973

3,759,732
PROCESS FOR THE MANUFACTURE OF A PIGMENT
Walter Twist, Fairfield, and Keith Goldsborough and John James Hinley, Teesside, England, assignors to British Titan Limited, Billingham, Teesside, England
No Drawing. Filed Mar. 18, 1971, Ser. No. 125,805
Claims priority, application Great Britain, Mar. 18, 1970, 13,168/70
Int. Cl. C09c 1/36
U.S. Cl. 106—300                                                  20 Claims

ABSTRACT OF THE DISCLOSURE

A process for treating pigmentary titanium dioxide with an alkyd resin in which the titanium dioxide has a coating of at least a hydrous oxide of aluminium and is mixed in the form of an aqueous paste with the alkyd resin dissolved in an organic solvent and subsequently drying the mixture to produce a treated pigmentary titanium dioxide. The treatment with the alkyd resin is effected under such conditions that there is no filtration or other solid separation process between the mixing and drying operations.

---

This invention relates to a process for the manufacture of a pigment and particularly to the manufacture of titanium dioxide pigment.

According to the present invention a process for the manufacture of pigmentary titanium dioxide comprises mixing a paste containing water and pigmentary titanium dioxide, the particles of which have a coating containing at least a hydrous oxide of aluminium with a solution of an alkyd resin in an organic solvent therefor and drying the mixture to produce pigmentary titanium dioxide, the individual particles of which have a coating of said alkyd resin without there being between said mixing and drying operations any filtration or other solid separation process.

The process of the present invention results in a pigment which can be dispersed easily, particularly in an oleoresinous medium such as a paint.

In the production of titanium dioxide pigment by the "sulphate" process or by the "chloride" process, it is usual to coat the pigment particles with one or more hydrous oxides to modify the surface characteristics of the pigment. Usually, this coating operation is performed in a wet process in which a slurry of the pigment in water is mixed with a water-soluble salt or compound and depositing the desired hydrous oxide by effecting a change in the pH of the slurry. After depositing the desired coating, the slurry is then filtered, washed and the filter cake is dried by any suitable means.

The process of the present invention involves mixing the filter cake obtained after the coating operation with the organic solution of the alkyd resin and then drying in the usual manner.

The alkyd resin that is used in the process of the present invention can be any alkyd resin and generally, these are the resinous reaction products of one or more polyhydric alcohols, one or more polycarboxylic acids or their anhydrides and fatty acids or their derivatives. Typical polyhydric alcohols used to manufacture alkyd resins or glycerol, ethylene glycol, polyethylene glycols, pentaerythritol, and the like. The alkyd resins can be modified to give either drying resins or non-drying resins depending on their actual constitution and the drying resins are those in which the fatty acid is one containing polyunsaturation such as those prepared from a drying oil such as linseed oil, tung oil or perilla oil. Non-drying alkyd resins are usually produced from non-drying oils and typical oils are coconut oil, castor oil, palm oil and the like.

The alkyd resins preferred for use in the process of the present invention are non-drying alkyd resins.

The amount of the alkyd resin mixed with the paste of pigmentary titanium dioxide depends only on the amount that it is desired to incorporate on the surface of the particles of pigment. Usually, amounts of alkyd resin are chosen so that the dried pigment contains as a coating from 0.5 percent to 20 percent of the alkyd resin based on the weight of titanium dioxide. Preferably amounts of resin are such that the pigment contains from 2 percent to 8 percent of the resin based on the weight of $TiO_2$.

The organic solvent used to form the solution of the alkyd resin can be any suitable organic solvent such as xylene, toluene or white spirit. The solvent used should be volatile at the temperature of drying to enable it to be volatilised to effect the deposition of the alkyd resin on the surface of the pigment particles. The concentration of the alkyd resin in the solution can vary over a wide range but usually, the concentration will be from 40 percent to 80 percent by weight based on the weight of solution (or expressed in any other suitable manner).

The titanium dioxide can be either anatase or rutile titanium dioxide. The pigment can be prepared by either the "sulphate" or "chloride" processes. Prior to being treated with the alkyd resin, the titanium dioxide is provided with a coating containing at least a hydrous oxide of aluminium. The hydrous oxide of aluminium can be applied by any one of the well known techniques and the amount of the hydrous oxide of aluminium is usually from 0.01 to 10 percent, preferably 0.5 to 6 percent, by weight of $TiO_2$. If desired, the coating can also contain other hydrous oxides such as hydrous oxides of zirconium, titanium, cerium, zinc or silicon and/or a phosphate. These other coating materials may be applied by well-known methods.

After treatment of the titanium dioxide with the alkyd resin, the pigment paste is dried in any suitable manner to remove the water and the organic solvent associated with the mixture. Typical drying means is a band drier or spray drier. If desired, after drying, the treated pigment can be ground in the dry state, for example in a fluid energy mill.

The treated pigment after drying is particularly suitable for use in the pigmentation of oleoresinous paints which are based on an alkyd resin which is compatible with the alkyd resin coating on the pigment.

The invention is illustrated in the following Example:

EXAMPLE

A rutile titanium dioxide calciner discharge was coated by conventional technique with a hydrous oxide of titanium in an amount of 1 percent based on weight of $TiO_2$ and a hydrous oxide of aluminium in an amount 3.7 percent based on weight of $TiO_2$.

The coated pigment was filtered and the paste containing 50 to 55% solids was mixed with various quantities of short-oil non-drying alkyl resin. The resin was added in the form of a solution in xylene obtainable under the designation P485X and the solution was stirred for a time between 30 to 60 minutes to allow complete resin adsorption by the particles.

After mixing for the stated time the paste was dried at 110° C. and then fluid energy milled.

Each treated pigment was tested for its dispersibility in paint by the following technique.

A 40% solids solution of pentaerythritol modified air drying soya alkyd resin obtainable under the name Beckosol P470 was prepared by mixing 2000 grams of the 70% solids resin with 1500 grams of high flash white spirit. 93 grams of the resin solution were mixed with 248 grams of the pigment under test in a high speed impeller mill for various lengths of time. During the final 30 seconds of mixing a further 27 grams of the 40% solids solution was added to produce the stabilised mill base.

A paint was then prepared by adding to a can the following ingredients:

| | | |
|---|---|---|
| Stabilised millbase | grams | 170 |
| Beckosol P470 (70%) | do | 132 |
| High flash white spirit | do | 15 |
| Driers solution | ml | 11.5 |
| Methyl ethyl ketoxime | ml | 0.5 |

The driers solution was made by taking 83 grams of cobalt naphthenate (containing 6% Co.), 208 grams of lead naphthenate (24% Pb) and 250 grams of calcium naphthenate (4% Ca) and making up to a volume of 1 litre with white spirit.

The ingredients were stirred and then trundled for 15 minutes.

The prepared paint was allowed to stand at rest for 30 minutes to permit the removal of gas bubbles and then the paint was stirred thoroughly to homogenise the mixture.

Draw-downs were prepared on Hegman gauges and the position on the gauge was noted for the first appearance of grits. Also noted was the position where the paint surface was composed almost wholly of pigment particles. Conventionally, the readings are expressed in the reverse order, for example 7–3, where 7 indicates the Hegman reading of where the surface is almost all pigment and 3 indicates the reading where grits are first noticed. The higher the second reading the more dispersed is the pigment.

The results are shown in the following Table I:

TABLE I

| | Hegman readings | | | |
|---|---|---|---|---|
| Mixing time | Control | 2% resin | 4% resin | 6% resin |
| 1 minute | <1 | 7½–2 | 7½–6¾ | 7½–6¾ |
| 2 minutes | <1 | 7½–6 | 7½–7 | 7½–7 |
| 3 minutes | 2–<1 | 7½–6½ | 7½–7¼ | 7½–7¼ |
| 4 minutes | 3–<1 | 7½–6½ | 7½–7¼ | 7½–7¼ |
| 5 minutes | 3–<1 | 7½–6½ | 7½–7¼ | 7½–7¼ |
| 6 minutes | 3–<1 | 7½–7 | 7½–7¼ | 7½–7¼ |

The control was a pigment prepared in a similar manner but without the resin treatment. The results show the improved dispersibility obtained by treatment with the resin.

What is claimed is:

1. A process for the manufacture of pigmentary titanium dioxide comprising:
   (A) mixing a paste comprising water and pigmentary titanium dioxide particles, said partciles having deposited on the surface thereof a coating comprising a hydrous oxide of aluminum, with a solution of an alkyd resin in an organic solvent for said alkyd resin, and,
   (B) drying the mixture to produce particles of said hydrous oxide coated pigmentary titanium dioxide which have a coating of said alkyd resin thereon.

2. A process according to claim 1 in which the alkyd resin is a non-drying resin.

3. A process according to claim 1 in which the amount of the alkyd resin is such that the dried pigment contains from 0.5 percent to 20 percent of the alkyd resin based on the weight of titanium dioxide.

4. A process according to claim 3 in which the amount of the alkyd resin is such that the dried pigment contains from 2 percent to 8 percent of the resin based on the weight of $TiO_2$.

5. A process according to claim 1 in which the organic solvent is volatile at the temperature at which the mixture is dried.

6. A process according to claim 1 in which the concentration of the alkyd resin in the solution is from 40 percent to 80 percent by weight based on the weight of the solution.

7. A process according to claim 1 in which the hydrous oxide of aluminum coating on the particles of titanium dioxide is present in an amount of from 0.01 to 10 percent by weight of $TiO_2$.

8. A process according to claim 7 in which the hydrous oxide of aluminium is present in an amount of from 0.5 to 6 percent by weight of $TiO_2$.

9. A process according to claim 1 in which the hydrous oxide of aluminium coating on the particles also contains a hydrous oxide of zirconium, titanium, cerium, zinc or of silicon and/or a phosphate.

10. A process according to claim 1 in which the dried treated pigment is milled in a fluid energy mill.

11. A process of claim 1 wherein between the mixing step (A) and the drying step (B) there are no filtration or other solid separation steps.

12. A process for the manufacture of dry pigmentary titanium dioxide comprising:
   (A) treating an aqueous slurry of titanium dioxide to deposit on the surface of the particles of titanium dioxide a hydrous oxide of aluminum,
   (B) filtering the slurry and obtaining a paste of titanium dioxide containing water,
   (C) mixing the paste obtained in (B) with a solution of an alkyd resin in an organic solvent therefor, and
   (D) drying the mixture to precipitate the required pigmentary titanium dioxide whereby the individual particles thereof have a coating of said alkyd resin, said process being conducted such that between the mixing step (C) and the drying step (D) there are no filtration or other solid separation processes.

13. The process of claim 1 wherein the mixing is conducted until the resin solution is adsorbed by the pigmentary titanium dioxide particles.

14. The process of claim 11 wherein the dried pigment contains from 0.5 percent to 20 percent alkyd resin based on the weight of titanium dioxide and the hydrous oxide of aluminum coating on the particles of titanium dioxide is present in an amount of from 0.01 to 10 percent by weight of $TiO_2$.

15. The process of claim 11 wherein the dried pigment contains from 2 percent to 8 percent of alkyd resin based on the weight of the titanium dioxide and the hydrous oxide of aluminum coating on the particles of titanium dioxide is present in an amount of from 0.5 to 6 percent by weight to $TiO_2$.

16. A product made by the process of claim 3.
17. A product made by the process of claim 9.
18. A product made by the process of claim 10.
19. A product made by the process of claim 11.
20. A product made by the process of claim 16.

References Cited
UNITED STATES PATENTS

| | | | |
|---|---|---|---|
| 2,176,219 | 10/1939 | Marling | 106—308 M |
| 2,613,159 | 10/1952 | Walton et al. | 106—308 M |
| 2,515,145 | 7/1950 | Van Dijck | 106—262 |

JAMES E. POER, Primary Examiner

U.S. Cl. X.R.
106—308 M